United States Patent
Ludwig et al.

(10) Patent No.: US 9,117,072 B2
(45) Date of Patent: Aug. 25, 2015

(54) SOFTWARE EXPLOIT DETECTION

(71) Applicant: Google Inc., Mountain View, CA (US)

(72) Inventors: Adrian L. Ludwig, Atherton, CA (US); Curtis Gerald Condra, IV, Sunnyvale, CA (US); Nicholas Neil Kralevich, IV, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/717,824

(22) Filed: Dec. 18, 2012

(65) Prior Publication Data

US 2014/0123285 A1    May 1, 2014

Related U.S. Application Data (60) Provisional application No. 61/719,468, filed on Oct. 28, 2012.

(51) Int. Cl.
*G06F 21/55* (2013.01)
*G06F 21/57* (2013.01)
*H04L 29/06* (2006.01)

(52) U.S. Cl.
CPC .............. *G06F 21/55* (2013.01); *G06F 21/552* (2013.01); *G06F 21/554* (2013.01); *G06F 21/577* (2013.01); *H04L 63/1433* (2013.01); *G06F 2221/2101* (2013.01)

(58) Field of Classification Search
CPC ......... G06F 21/00; G06F 21/50; G06F 21/70; G06F 2221/03; G06F 2221/21
USPC ......................................................... 726/23
See application file for complete search history.

(56) References Cited

U.S. PATENT DOCUMENTS

| | | | |
|---|---|---|---|
| 6,772,346 B1 * | 8/2004 | Chess et al. | 709/223 |
| 7,185,366 B2 * | 2/2007 | Mukai et al. | 726/23 |
| 7,797,752 B1 * | 9/2010 | Vaidya et al. | 726/27 |
| 7,818,800 B1 * | 10/2010 | Lemley et al. | 726/22 |
| 7,934,103 B2 * | 4/2011 | Kidron | 713/188 |
| 8,245,297 B2 * | 8/2012 | Lim | 726/23 |
| 8,296,848 B1 | 10/2012 | Griffin et al. | |
| 2005/0235360 A1 * | 10/2005 | Pearson | 726/23 |
| 2007/0192867 A1 | 8/2007 | Miliefsky | |

OTHER PUBLICATIONS

ISR and Written Opinion dated Mar. 3, 2014 for PCT/US2013/066070.

(Continued)

*Primary Examiner* — Dant Shaifer Harriman
(74) *Attorney, Agent, or Firm* — Morris & Kamlay LLP (57) ABSTRACT

A method may include, in a computing device including a processor, memory, an operating system, and at least one installed application, detecting an attempted exploitation of at least one known vulnerability associated with the device. The attempted exploitation may be logged. At least one remedial action may be performed on the device based on the logged attempted exploitation. The known vulnerability may be associated with the operating system and/or the at least one installed application. The at least one known vulnerability may include one or more of at least one known coding flaw in the operating system or in the at least one installed application, at least one known weakness in a protocol running on the computing device, a known family of coding flaws in the operating system or in the at least one installed application, an unauthorized triggering of premium SMS services, and/or triggering of a hostile misconfiguration.

6 Claims, 5 Drawing Sheets

(56) References Cited

OTHER PUBLICATIONS

Kent, Karen et al.,"Guide to Computer Security Log Management", Recommendations of the National Institute of Standards and Technology, National Institute of Standards and Technology, National Institute of Standards and Technology; Special Publication 800-92, Sep. 1, 2006, XP008110666, p. 27, p. 17, p. 36, Sep. 1, 2006.

Kent, Karen et al.,"Special Publication 800-86 Guide to Integrating Forensic Techniques into Incident Response Reconnendations of the National Institute of Standards and Technology", Aug. 31, 2006, XP055100041, Retrieved from the Internet: URL:http://csrc.nist.gov/publications/nistpubs/800-86/SP800-86.pdf [retrieved on Feb. 4, 2014] p. 91, paragraph 3-paragraph 5, p. 92, paragraph 1 p. 92, paragraph 5, Aug. 31, 2006.

\* cited by examiner

SOFTWARE EXPLOIT DETECTION

CROSS-REFERENCE TO RELATED APPLICATIONS/INCORPORATION BY REFERENCE

This application makes reference to and claims priority to U.S. Provisional Application Ser. No. 61/719,468, filed on Oct. 28, 2012, entitled "Software Exploit Detection," which is incorporated herein by reference in its entirety.

BACKGROUND

It is often difficult to detect device applications, which exploit vulnerabilities in the device operating system. Many vulnerabilities have tell-tale characteristics associated with exploitation. However, dynamic code and inputs make it difficult to detect many types of vulnerabilities exploitation by using static analysis, or even by reviewing applications dynamically within emulators.

Further limitations and disadvantages of conventional and traditional approaches will become apparent to one of skill in the art, through comparison of such approaches with some aspects of the present method and apparatus set forth in the remainder of this disclosure with reference to the drawings.

SUMMARY

A system and/or method is provided for software exploit detection, substantially as shown in and/or described in connection with at least one of the figures, as set forth more completely in the claims.

In accordance with an example embodiment of the disclosure, a method may include, in a computing device including a processor, memory, an operating system, and at least one installed application, detecting an attempted exploitation of at least one known vulnerability associated with the device. The attempted exploitation may be logged. At least one remedial action may be performed on the device based on the logged attempted exploitation. The known vulnerability may be associated with the operating system and/or the at least one installed application. The at least one known vulnerability may include one or more of at least one known coding flaw in the operating system or in the at least one installed application, at least one known weakness in a protocol running on the computing device, a known family of coding flaws in the operating system or in the at least one installed application, unauthorized triggering of premium SMS services, and/or triggering of hostile misconfiguration.

In accordance with another example embodiment of the disclosure, a method may include, in a network device including a processor and a memory, receiving from at least one computing device, at least one log entry. The at least one log entry may include a log record indicating an attempted exploitation at the at least one computing device, of at least one known vulnerability associated with the at least one computing device. The at least one log entry may be stored in, for example, one or more files, system RAM, and/or a location exterior to the device generating the log entry. At least one instruction associated with at least one remedial action may be generated and communicated to the at least one computing device.

These and other advantages, aspects and features of the present disclosure, as well as details of illustrated implementation(s) thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The present disclosure relates to a method and system for software exploit detection. More specifically, on-device logs may be created by a computing device and then retrieved to detect and prevent exploitation of known vulnerabilities.

Dynamic code and inputs may cause difficulty in detecting some types of exploitation without collecting data in the field. In accordance with an example embodiment of the disclosure, attempted exploits of known vulnerabilities on live user devices may be anonymously logged. The logs may then be selectively collected and used by, for example, an analysis server (e.g., a service provider) to protect the user of the computing device (as well as similar users of similar computing devices that use services of the service provider) by suspending device applications (e.g., in an online application marketplace), blocking applications through platform anti-malware, changing device configuration, fixing the vulnerability, or taking another remedial action.

Many vulnerabilities have tell-tale characteristics associated with exploitation, for example, passing a too-long string into a buffer or receiving two different responses from a DNS server when requesting a single lookup. In accordance with an example embodiment of the disclosure, in instances when a potential vulnerability is identified, at the time of the fix, logging code may be inserted into the operating system platform (or into an application) of one or more devices, along with the fix if it is available. If a fix is infeasible or impossible, then logging code may be created and inserted independent of any fix. The logging code may be used to generate a system log when a potential exploit is detected. The log may contain information required for preventive measures to be deployed to a broad set of devices. The specific device that detected the exploitation may be protected as part of a larger group of protected devices.

Individual log entries from one or more devices in a device ecosystem may be pushed to (or retrieved by) an analysis server. The received logs may be analyzed by the analysis server to identify applications that may have been (or currently are) exploited, so that corresponding remedial measures may be taken to remedy the software exploit at the reporting device (or devices) as well as prevent similar exploits to remaining group of devices in the device ecosystem.

Figure 1:
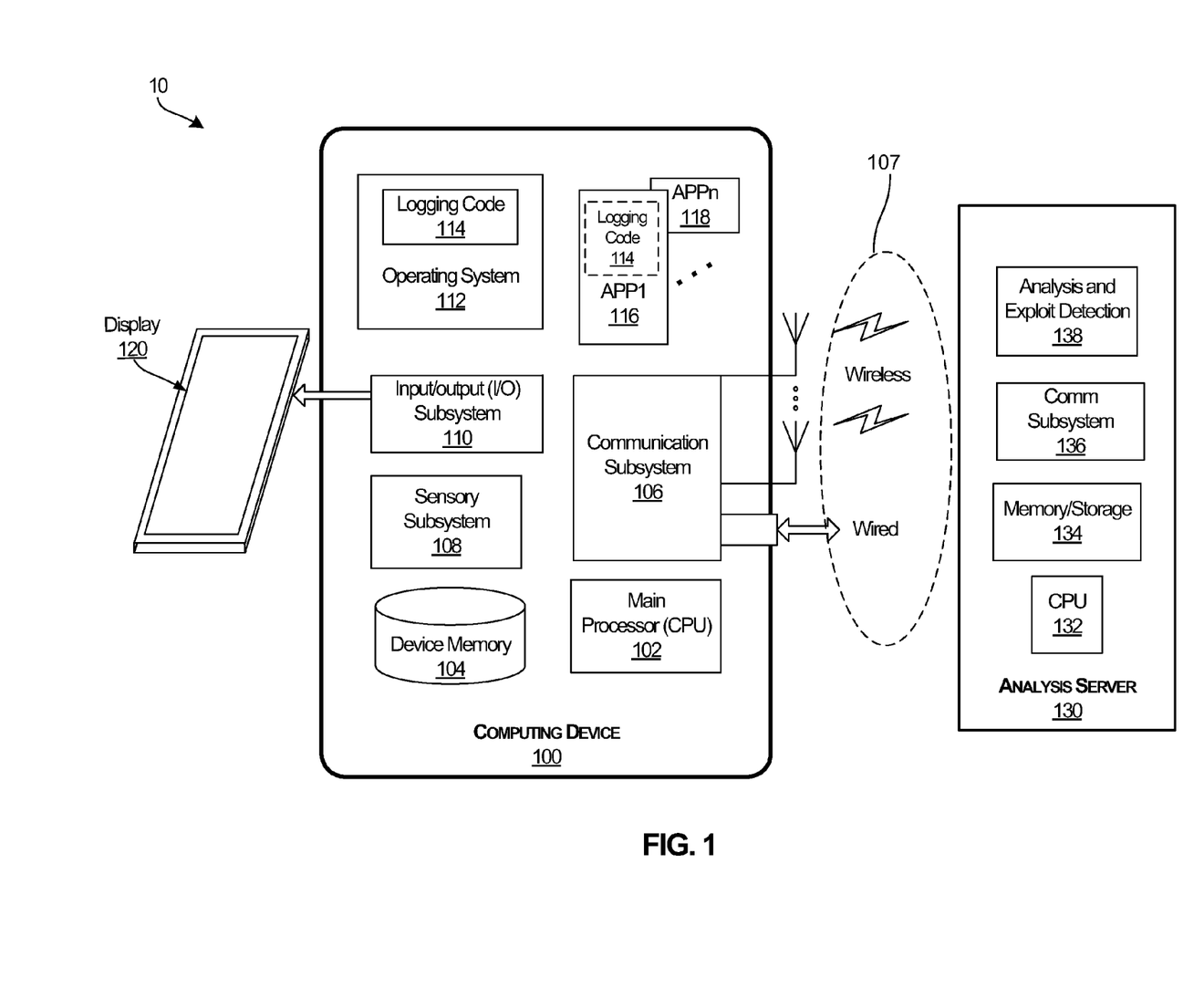
FIG. 1 is a block diagram illustrating an example architecture including a computing device with software exploit logging capabilities communicating with an analysis server, in accordance with an example embodiment of the disclosure.

FIG. 1 is a block diagram illustrating an example architecture including a computing device with software exploit logging capabilities communicating with an analysis server, in accordance with an example embodiment of the disclosure. Referring to FIG. 1, the example architecture 10 may comprise a computing device 100 and an analysis server 130.

The computing device 100 may comprise suitable logic, circuitry, interfaces, and/or code that may be operable to implement various aspects of the anonymization framework 100 of FIG. 1. The computing device 100 may comprise a handset, a smartphone, a tablet, a laptop, and/or another handheld or portable device. The computing device 300 may comprise, for example, a main processor 102, a system memory 104, a communication subsystem 106, a sensory subsystem 108, an input/output (I/O) subsystem 110, and a display 120.

The computing device may also comprise an operating system 112 and one or more applications 116, . . . , 118 running on the computing device 100. The computing device 100 may also comprise logging code 114, which may be implemented within the operating system 112 and/or the one or more applications 116, . . . , 118.

The main processor 102 may comprise suitable logic, circuitry, interfaces, and/or code that may be operable to process data, and/or control and/or manage operations of the computing device 100, and/or tasks and/or applications performed therein in connection with the anonymization framework 100. In this regard, the main processor 102 may be operable to configure and/or control operations of various components and/or subsystems of the computing device 100, by utilizing, for example, one or more control signals. The main processor 102 enables running and/or execution of applications, programs and/or code (e.g., one or more applications 116, . . . , 118), which may be stored, for example, in the system memory 104. Alternatively, one or more dedicated application processors may be utilized for running and/or executing applications (or programs) (e.g., one or more applications 116, . . . , 118) in the computing device 100.

In some instances, one or more of the applications 116, . . . , 118 running and/or executing on the computing device 100 may generate and/or update video content that may be rendered via the display 120. In other instances, one or more of the applications 116, . . . , 118 running and/or executing on the computing device 100, as well as the logging code 114, may be used to perform functionalities explained herein in reference to software exploit detection.

The system memory 104 may comprise suitable logic, circuitry, interfaces, and/or code that may enable permanent and/or non-permanent storage, buffering, and/or fetching of data, code and/or other information, which may be used, consumed, and/or processed. In this regard, the system memory 104 may comprise different memory technologies, including, for example, read-only memory (ROM), random access memory (RAM), Flash memory, solid-state drive (SSD), and/or field-programmable gate array (FPGA). The system memory 104 may store, for example, configuration data, which may comprise parameters and/or code, comprising software and/or firmware (e.g., the operating system 112, the logging code 114 and/or the one or more applications 116, . . . , 118).

The communication subsystem 106 may comprise suitable logic, circuitry, interfaces, and/or code operable to communicate data from and/or to the computing device, such as via one or more wired and/or wireless connections 107. The communication subsystem 106 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing device 100, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 106 may provide wired and/or wireless connections to, for example, the analysis server 130 via the wired and/or wireless connections 107.

The sensory subsystem 108 may comprise suitable logic, circuitry, interfaces, and/or code for obtaining and/or generating sensory information, which may relate to the computing device 100, its user(s), and/or its environment. For example, the sensory subsystem 108 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 110 may comprise suitable logic, circuitry, interfaces, and/or code for enabling user interactions with the computing device 100, enabling obtaining input from user(s) and/or to providing output to the user(s). The I/O subsystem 110 may support various types of inputs and/or outputs, including, for example, video, audio, and/or textual. In this regard, dedicated I/O devices and/or components, external to or integrated within the computing device 100, may be utilized for inputting and/or outputting data during operations of the I/O subsystem 110. Example I/O devices may comprise displays, mice, keyboards, touchscreens, voice input interfaces, and other input/output interfaces or devices. With respect to video outputs, the I/O subsystem 110 may be operable to generate and/or process video content, graphics, and/or textual data, and/or generate video frames based thereon for display, via the display 120 for example.

The display 120 may comprise suitable logic, circuitry, interfaces and/or code that may enable displaying of video content, which may be handled and/or processed via the I/O subsystem 110. The display 120 may be used in outputting video data.

The operating system 112 may include software that is used to manage the various hardware resources of the communication device 100. The operating system 112 may also be used to provide common services to computer programs or applications, such as the one or more applications 116, . . . , 118. The operating system 112 tends to act as an intermediary between the hardware components and the one or more applications 116, . . . , 118. In some implementations, processes in the operating system 112 (e.g., logging code 114) may be used to generate a log when a known vulnerability associated with the one or more applications 116, . . . , 118 and/or the operating system 112 is exploited.

The one or more applications 116, . . . , 118 may include one or more software applications (i.e., computer programs) that help the user perform a specific task. For example, a software application may include an interactive application that displays content to a user and allows the user to provide input as to the manner in which the content is provided and/or the type of content that is provided. To perform a task (e.g., web browsing, video playback, etc.), the one or more applications 116, . . . , 118 may access the CPU 102, the memory 104, and/or any other circuit within the computing device 100, as well as the operating system 112.

The logging code 114 may be implemented within the operating system 112 and/or within at least one of the one or more applications 116, . . . , 118. The logging code 114 may be operable to detect one or more exploitations of a known vulnerability (or known classes of vulnerabilities) by the one or more applications 116, . . . , 118, and create a log entry with details regarding the exploitation. The generated log entry may be subsequently pushed to (or retrieved by) the analysis server 130 for further processing. The log entry may be stored in, for example, one or more files, system RAM, and/or a location exterior to the device generating the log entry.

Figure 3:
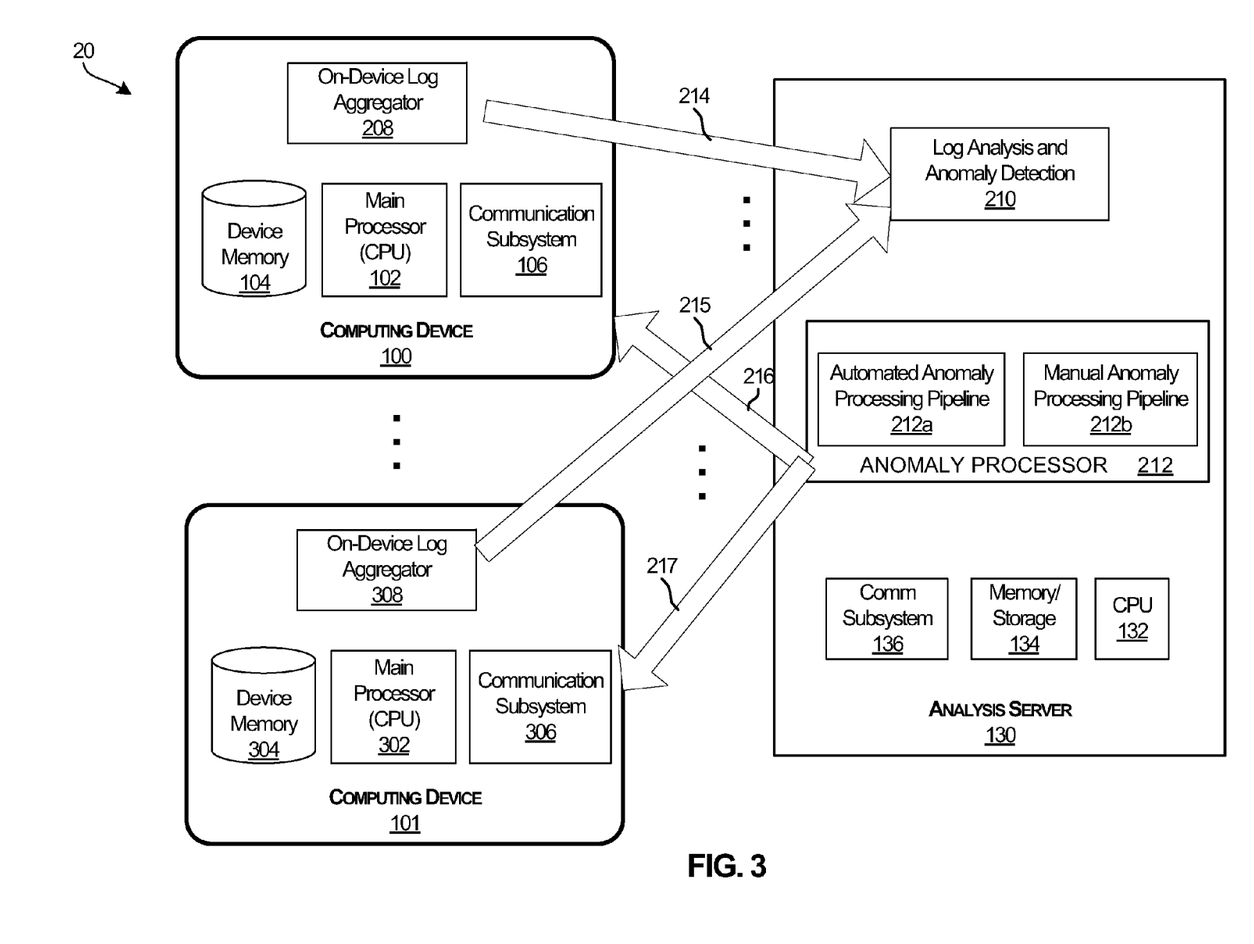
FIG. 3 is a block diagram illustrating an example architecture including a plurality of computing devices with software exploit logging capabilities communicating with an analysis server, in accordance with an example embodiment of the disclosure.

The analysis server 130 may comprise suitable circuitry, logic and/or code and may be operable to provide one or more functionalities to the computing device 100 (and/or other similar devices in a device ecosystem; see e.g., FIG. 3), including software and device security functionalities relating to administration and operation of the operating system 112. The analysis server 130 may comprise a CPU 132, a memory 134, and a communication subsystem 136, which may be similar in functionalities to the CPU 102, the memory 104 and the communication subsystem 106, respectively, in the computing device 100. The analysis server 130 may also comprise an analysis and exploit detection system 138.

The analysis and exploit detection system 138 may comprise suitable circuitry, logic and/or code and may be operable to receive (or retrieve) one or more log entries from the computing device 100 and/or other similar devices within a device ecosystem using the same operating system 112. The analysis and exploit detection system 138 may then analyze the retrieved log entries to determine one or more appropriate remedial actions, which may be taken with regard to the software exploit detected by the computing device 100 (and/or by other similarly affected, or yet unaffected, devices in the device ecosystem running operating system 112).

In operation, the computing device 100 may be utilized (e.g., by a user) to perform, execute, or run various tasks and/or applications (e.g., at least one of the one or more applications 116, . . . , 118). The logging code 114 may also run in the background, as part of the operating system 112 and/or the one or more applications 116, . . . , 118. The logging code 114 may detect an exploit attempt of a known vulnerability (or known classes of vulnerabilities). A number of possible exploits are discussed herein below in reference to FIG. 2.

In accordance with an example embodiment of the disclosure, in some instances, the logging code 114 may be operable to detect a possible exploit of previously unidentified vulnerability. In this instance, an exploit of such previously unidentified vulnerability may be presumed based on one or more device exceptions. For example, it may be assumed that there is a vulnerability exploit if the device 100 detects a crash (or another type of exception) based on an application writing to an allocated memory (or another type of action). If similar crashes are reported multiple times from device 100 and/or other similar devices, then it may be presumed that a vulnerability exploit is taking place (associated with a known class of vulnerabilities).

Upon detecting of an exploit attempt of a known vulnerability, the logging code 114 may generate a log entry with information identifying the type of exploit, the application that initiated the exploit, and other identifying information. The logging code 114 may then aggregate all created logs and, periodically, push (or communicate) the aggregated logs to the analysis server 130 for further processing. In this regard, the logging code 114 may comprise exploit detection functionalities, on-device log creation functionalities, and on-device log aggregation functionalities.

After the aggregated log is pushed to (or retrieved by) the analysis server 130, the analysis server 130 may use the analysis and exploit detection system 138 analyze the retrieved log entries to determine one or more appropriate remedial actions, which may be taken with regard to the software exploit detected by the computing device 100 (and/or by other similarly affected, or yet unaffected, devices in the device ecosystem running operating system 112).

Figure 2:
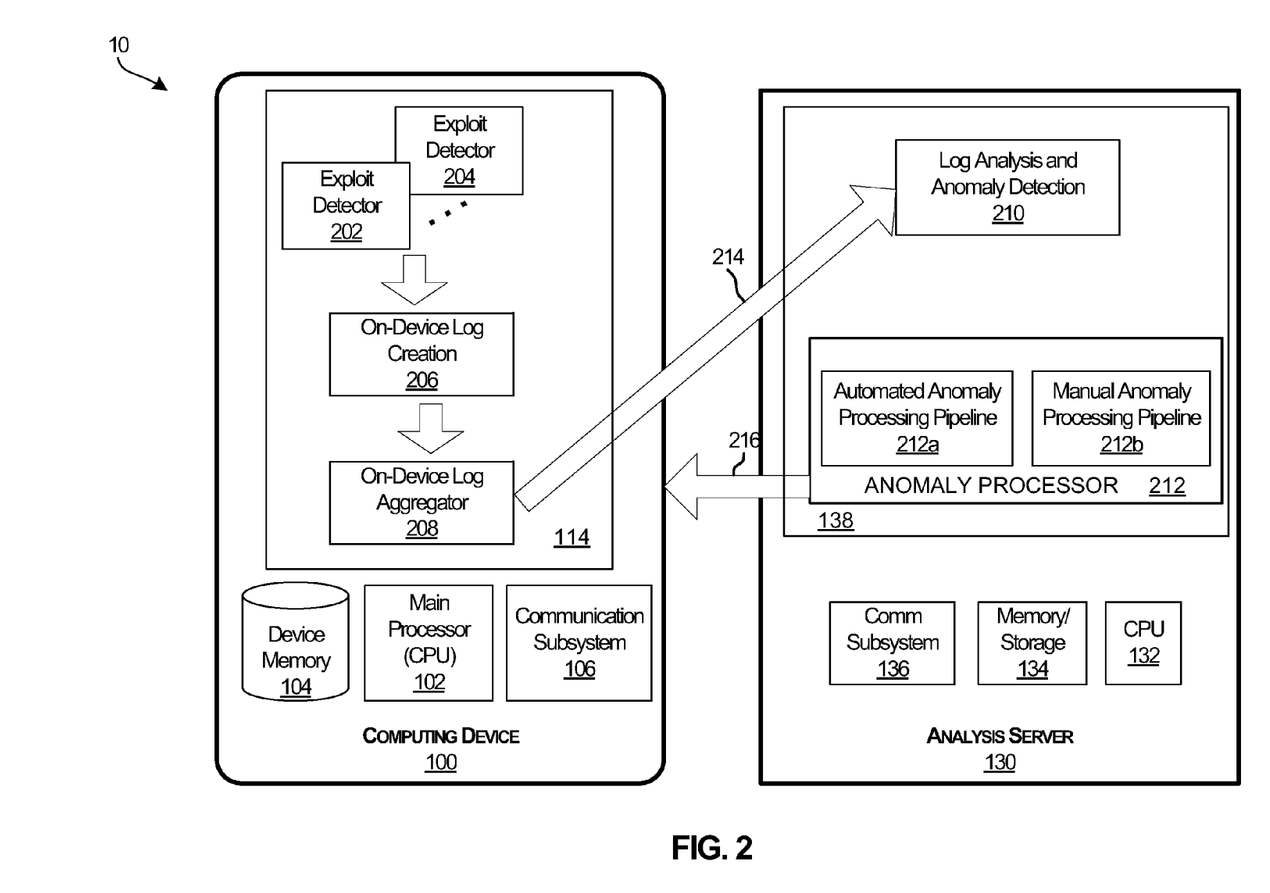
FIG. 2 is a more detailed block diagram of the example architecture of FIG. 1, in accordance with an example embodiment of the disclosure.

FIG. 2 is a more detailed block diagram of the example architecture of FIG. 1, in accordance with an example embodiment of the disclosure. Referring to FIG. 2, there is illustrated the same example architecture 10 of FIG. 1, comprising the computing device 100 and the analysis server 130. However, FIG. 2 illustrates a more detailed view of the functionalities provided by the logging code 114 as well as the functionalities provided by the analysis and exploit detection system 138.

More specifically, the functionalities provided by the logging code 114 may include exploit detectors 202, . . . , 204, on-device log creation 206, and on-device log aggregator 208. The functionalities provided by the analysis and exploit detection system 138 may include log analysis and anomaly detection 210 and an anomaly processor 212. The anomaly processor 212 may comprise an automated anomaly processing pipeline 212a and a manual anomaly processing pipeline 212b.

The exploit detectors 202, . . . , 204 may comprise suitable code and may be operable to detect exploits of known vulnerabilities. Such known vulnerabilities include, but may not be limited to, (1) at least one known coding flaw in the operating system or in the at least one installed application; (2) at least one known weakness in a protocol running on the computing device; (3) a known family of coding flaws in the operating system or in the at least one installed application; (4) unauthorized triggering of premium SMS services; and (5) triggering of hostile misconfiguration.

(1) "At Least One Known Coding Flaw" (a.k.a. "Bug" or "Software Bug").

One or more of the exploit detectors 202, . . . , 204 may be operable to detect an exploit of at least one known flaw in the code of the operating system (e.g., 112) or in the at least one installed application (e.g., 116, . . . , 118). The exploit detector may then generate a log and may include, for example, the application name and application version of the application that initiates the exploit of the known coding flaw. The malicious application may be subsequently blocked by the device 100 (and/or other similar devices) and/or may be removed from an online store (e.g., an on-line store operated by the analysis server 130).

(2) "At Least One Known Weakness in a Protocol Running on the Computing Device".

In operation, one or more of the exploit detectors 202, . . . , 204 may be operable to detect an exploit of a known weakness of a protocol running on the computing device 100. An example of such protocol may be DNS. An exploit may be detected when, for example, the operating system 112 receives an unexpected TXID on a response for a DNS request, an incorrect DNS name (with correct TXID) on a response to a DNS request, and/or a near-duplicate response with a different remote server. If one or more of these exploits are detected, a log may be generated and may include an indication that one or more of the identified events has occurred and the log is not yet communicated to the server 130. In this regard, a "network fingerprint" may be created, allowing for identification of hostile networks, and potentially warn users if their device (e.g., device 100) is on one of the hostile networks.

(3) "A Known Family of Coding Flaws in the Operating System or in the at Least one Installed Application."

One or more of the exploit detectors 202, . . . , 204 may be operable to detect an exploit of a known family of coding flaws in the code of the operating system (e.g., 112) or in the at least one installed application (e.g., 116, . . . , 118). For example, the exploit detectors 202, . . . , 204 may be operable to monitor and detect particular types of coding errors, such as memory management errors (buffer overflow) and integer overflows. This type of coding errors may be common with media codecs, and video/audio signal processing. Upon detection of an exploit, the exploit detector may then generate a log and may include, for example, the application name and application version of the application that crashed due to an ingestion of malformed data (e.g., a buffer overflow and/or an integer overflow). In this regard, a determination may be made as to whether versions of a given application are being exploited on the current device (100) and/or other devices (e.g., devices that do not have the exploit detectors 202, . . . , 204). As a possible remedial action, particular (types of) applications may be "hardened" or platform updates may be encouraged that resolve vulnerability exploits.

(4) "Unauthorized Triggering of Premium SMS Services."

One or more of the exploit detectors 202, . . . , 204 may be operable to detect Premium SMS malware in the operating system (e.g., 112) or in the at least one installed application (e.g., 116, . . . , 118). Such malware may trigger an application to dial a premium SMS phone number, resulting in a substantial dial fees.

It may be difficult, from a technical standpoint, to evaluate whether an application is trying to trick a device user. However, a user may be notified in instances when a given application is about to dial a premium (toll) number or send an SMS to a premium number. User feedback may then be used to detect applications that initiate the Premium SMS service without user intent or instructions. If a determined number of users report or indicate that a given application maliciously invokes Premium SMS services, then it may be safely assumed that the application is malicious.

In this regard, the exploit detectors 202, . . . , 204 may look for are applications that are using regular system functionalities (e.g., dialing a premium number and/or sending an SMS to a premium number), but do so in a manner that is designed to mislead users (e.g., the premium number is dialed without user consent or knowledge). Appropriate remedial measures may be taken with regard to applications that are being regularly or excessively blocked by users after an exploit detector has detected the malicious attempt of dialing a premium phone number and has reported such attempt to the user. The log entry created in this instance may identify the malicious application as well as the number of times a premium number was attempted to be dialed. Aggregated log entries of such exploit detection may be analyzed by the analysis and exploit detection system 138, and upon a determination by the analysis server 130, a remedial action may be initiated. The remedial action may include blocking of the application by the device 100 (and/or other similar devices) and/or removing of the application from an online store (e.g., an on-line store operated by the analysis server 130).

(5) "Triggering of Hostile Misconfiguration."

One or more of the exploit detectors 202, . . . , 204 may be operable to detect triggering of hostile misconfiguration associated with the operating system (e.g., 112) or the at least one installed application (e.g., 116, . . . , 118). For example, hostile misconfiguration may be triggered (and detected) when there is an attempt to access an SSL protected property, and the device 100 receives a certificate signed by (issued by) the wrong certificate authority (CA). In this instance, the exploit detectors 202, . . . , 204 may cause the on-device log creation module 206 to generate a log with the certificate chain received by device 100 when the attempt to access the SSL protected property is made. This type of log entry, similarly to the preceding example, may be analyzed by the analysis server 130 to find compromised or untrustworthy CAs, as well as the malicious applications that invoke them, and then take appropriate remedial action.

After the exploit detectors 202, . . . , 204 detect a given exploit of a known vulnerability (e.g., examples (1)-(5) above), the on-device log creation module 206 may generate a log entry with information identifying the exploit and/or the application initiating the exploit. The on-device log aggregator 208 may be operable to aggregate one or more logs created by the on-device log creation module 206, and may periodically (at a pre-determined intervals) push the aggregated log entries to the log analysis and anomaly detection module 210 within the analysis server 130 via (wired and/or wireless) communication path 214.

The log analysis and anomaly detection module 210 may comprise suitable circuitry, logic and/or code and may be operable to aggregate log entries received from the computing device 100 and/or other similar computing devices (see FIG. 3 below), and analyze the log entry to extract one or more anomalies associated with software exploits on the device 100 (and/or other similar devices). The anomaly information may be communicated to the anomaly processor 212.

The anomaly processor 212 may comprise an automated anomaly processing pipeline 212a and a manual anomaly processing pipeline 212b. The automated anomaly processing pipeline 212a may comprise suitable circuitry, logic and/or code and may be operable to perform automated analysis on the anomalies and determine one or more remedial actions to take in reference to the application(s) causing the exploits associated with the detected anomalies. The manual anomaly processing pipeline 212b may comprise suitable circuitry, logic and/or code and may be operable to perform analysis on the anomalies based on manual input from a user, and determine one or more remedial actions to take in reference to the application(s) causing the exploits associated with the detected anomalies.

The one or more remedial actions determined by the anomaly processor 212 may include suspending applications in an online market, blocking applications through platform anti-malware, changing device configuration, fixing the exploited vulnerability, and/or other remedial actions. Based on the determined one or more remedial actions, the analysis server 130 may generate one or more control signals (e.g., code), which may be pushed to (and installed on) the device 100 via the (wired and/or wireless) communication path 216.

FIG. 3 is a block diagram illustrating an example architecture including a plurality of computing devices with software exploit logging capabilities communicating with an analysis server, in accordance with an example embodiment of the disclosure. Referring to FIG. 3, the example architecture 20 is substantially similar to the example architecture 10 of FIGS. 1-2, except that multiple computing devices 100, ..., 101 are illustrated.

The additional devices (e.g., device 101) may be similar to device 100 and may also run the same operating system 112 and applications 116, ..., 118. Furthermore, the on-device log aggregator 308 of device 101 may be operable (similarly to the on-device log aggregator 208 of device 100) to aggregate one or more logs created by an on-device log creation module (not illustrated), and may periodically (at a pre-determined intervals) push the aggregated log files to the log analysis and anomaly detection module 210 within the analysis server 130 via (wired and/or wireless) communication path 215.

Based on the determined one or more remedial actions (as explained above), the analysis server 130 may generate one or more control signals (e.g., code), which may be pushed to (and installed on) the device 101 via the (wired and/or wireless) communication path 217. In this regard, aggregated logs may be communicated to the analysis server 130 from one or more of the devices 100, ..., 101. Additionally, the analysis server 130 may communicate control signals for implementing determined remedial actions to the reporting portion of devices 100, ..., 101 as well as any non-reporting devices (e.g., for purposes of preventive maintenance and addressing potential software exploit issues preemptively).

Figure 4:
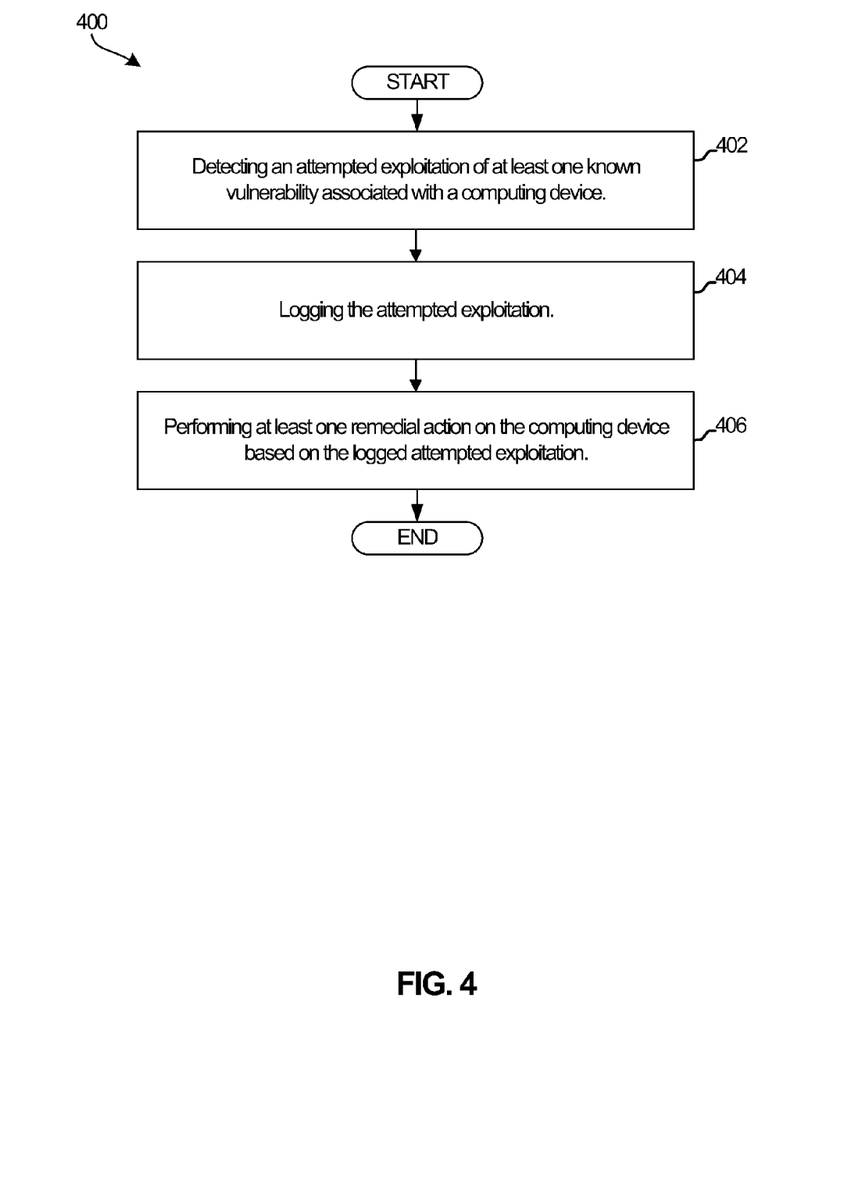
FIG. 4 is a flow chart illustrating example steps of a method for software exploit detection by a computing device, in accordance with an example embodiment of the disclosure.

FIG. 4 is a flow chart illustrating example steps of a method for software exploit detection by a computing device, in accordance with an example embodiment of the disclosure. Referring to FIGS. 1-4, the example method may start at 402, when an attempted exploitation of at least one known vulnerability associated with a computing device 100 may be detected (e.g., by the exploit detectors 202, ..., 204, as explained in reference to FIG. 2). At 404, the attempted exploitation may be logged (e.g., by the on-device log-creation module 206). At 406, at least one remedial action may be performed on the computing device (100) based on the logged attempted exploitation (e.g., using a control signal or software code received from the analysis server 130).

Figure 5:
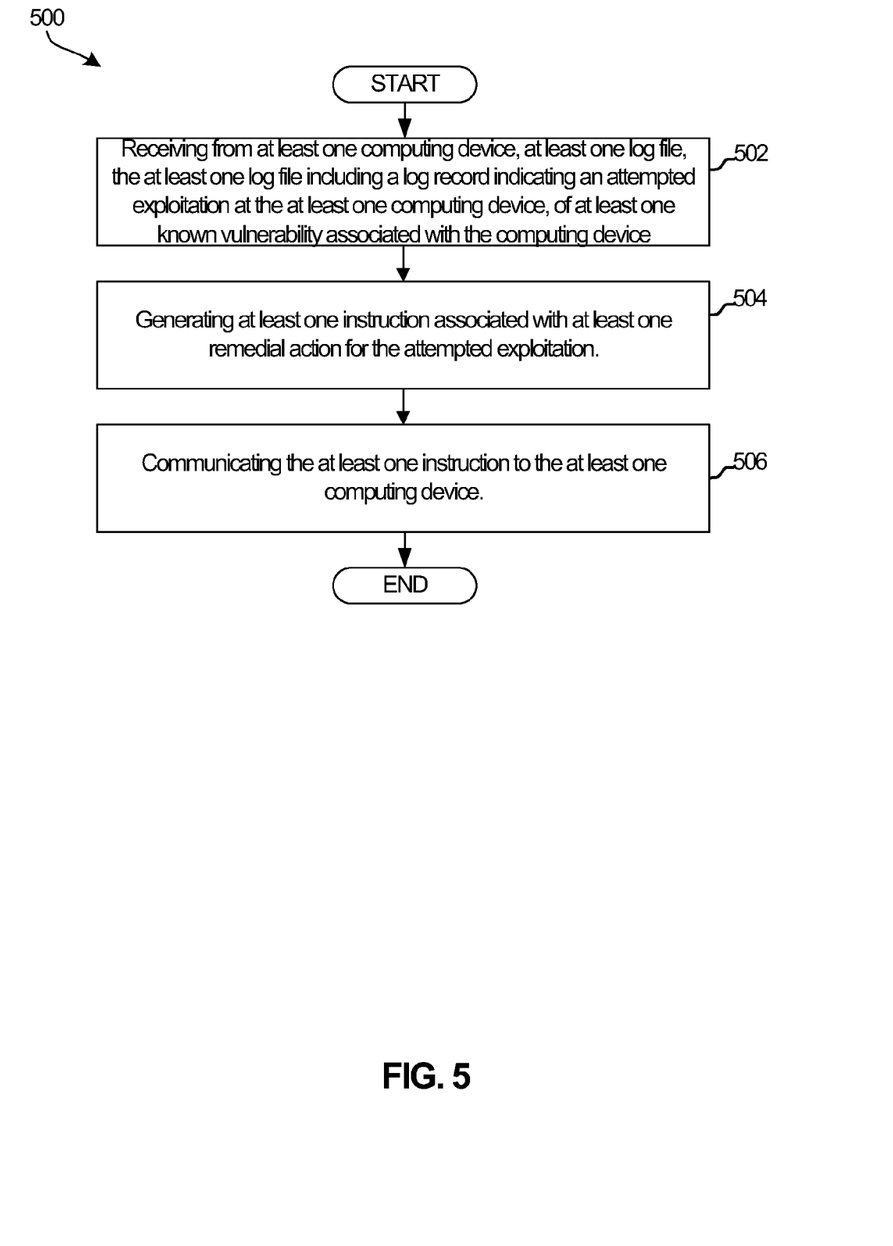
FIG. 5 is a flow chart illustrating example steps that may be performed by an analysis server during software exploit detection, in accordance with an example embodiment of the disclosure.

FIG. 5 is a flow chart illustrating example steps that may be performed by an analysis server during software exploit detection, in accordance with an example embodiment of the disclosure. Referring to FIGS. 1-3 and 5, the example method 500 may start at 502, when at least one log entry (e.g., created by on-device log aggregator 208) may be received (at the analysis server 130) from the computing device 100 (via communication path 214). The at least one log entry may including a log record indicating an attempted exploitation at the at least one computing device 100, of at least one known vulnerability associated with the computing device 100. At 504, at least one instruction associated with at least one remedial action for the attempted exploitation may be generated (e.g., by the anomaly processor 212 or another module within the analysis server 130). At 506, the at least one instruction may be communicated to the at least one computing device 100 (e.g., via communication path 216), and implemented by the device 100 (e.g., by implementing and executing software code associated with the instruction).

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a hardware processor, memory, and a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method for remediating, via a network device including a processor and a memory, attempted exploitations associated with a plurality of computing devices, the plurality of computing devices including at least one reporting computing device, having a processor, memory, an operating system, and at least one installed application, that identifies and reports the attempted exploitations, and at least one non-reporting computing device that has not reported the attempted exploitations, the method comprising:

identifying an attempted exploitation of the at least one reporting computing device;

inserting a logging code into the operating system of the at least one reporting computing device based on the identifying an attempted exploitation of the at least one reporting computing device;

receiving from the at least one reporting computing device, an aggregated log, wherein the aggregated log is created via the logging code on the at least one reporting computing device and comprises a log record indicating the attempted exploitations of the computing device;

generating, based on the aggregated log, at least one instruction to remediate an attempted exploitation recorded in the aggregated log; and communicating the at least one instruction to the at least one reporting computing device and to the at least one non-reporting computing device.

2. The method according to claim 1, comprising:
analyzing, using at least one analysis pipeline in the network device, the received aggregated log, wherein the generating at least one instruction is based on the analyzing.

3. The method according to claim 2, wherein the at least one analysis pipeline comprises one or both of:
an automated log processing pipeline, the automated log processing pipeline comprising at least one processor that automatically processes the received aggregated log and generates the at least one instruction; or
a manual log processing pipeline, wherein the manual log processing pipeline processes the received aggregated log and generates the at least one instruction based on user input.

4. A non-transitory, machine-readable storage medium, having stored thereon a computer program having at least one code section, the at least one code section being executable by a network device including a processor and a memory, for causing the network device to remediate attempted exploitations associated with a plurality of computing devices, the plurality of computing devices including at least one reporting computing device, having a processor, memory, an operating system, and at least one installed application, that identifies and reports the attempted exploitations, and at least one non-reporting computing device that has not reported the attempted exploitations, where the network device further is to:
identify an attempted exploitation of the at least one reporting computing device;
insert a logging code into the operating system of the at least one reporting computing device based on the identifying an attempted exploitation of the at least one reporting computing device;
receive, from the at least one reporting computing device, an aggregated log, wherein the aggregated log is created via the logging code on the at least one reporting computing device and comprises a log record indicating the attempted exploitations the at least one reporting computing device;
generate, based on the aggregated log, at least one instruction to remediate an attempted exploitation recorded in the aggregated log; and
communicate the at least one instruction to the at least one reporting computing device and to the at least one non-reporting computing device.

5. A method comprising:
identifying, via a processor associated with a computing device, an attempted exploitation of the computing device;
inserting, via a processor associated with the computing device, a logging code into an operating system of the computing device based on the identifying an attempted exploitation of the computing device;
logging, via the logging code inserted into the operating system of the computing device, the attempted exploitation of the computing device to create a log;
detecting, via the logging code inserted into the operating system of the computing device, other attempted exploitations of the computing device;
logging, via the logging code inserted into the operating system of the computing device, the other attempted exploitations to create a plurality of logs;
aggregating, via the logging code on the computing device, the log and the plurality of logs to create an aggregated log;
communicating the aggregated log to a remote server for analysis; and
performing at least one remedial action on the computing device based on the analysis.

6. A non-transitory computer-readable medium of a computing device, the non-transitory computer-readable medium storing one or more instructions that when executed by at least one processor of the computing device, cause at least one processor to:
identify an attempted exploitation of the computing device;
insert a logging code into an operating system of the computing device based on the identifying an attempted exploitation of the computing device;
log the attempted exploitation of the computing device to create a log;
detect other attempted exploitations of the computing device;
log the other attempted exploitations to create a plurality of logs;
aggregate the log and the plurality of logs to create an aggregated log;
communicate the aggregated log to a remote server for analysis; and
perform at least one remedial action on the computing device based on the analysis.

* * * * *